B. J. BUTLER.
COMBINED FEED HEATER AND TROUGH.
APPLICATION FILED OCT. 30, 1908.
930,458.
Patented Aug. 10, 1909.
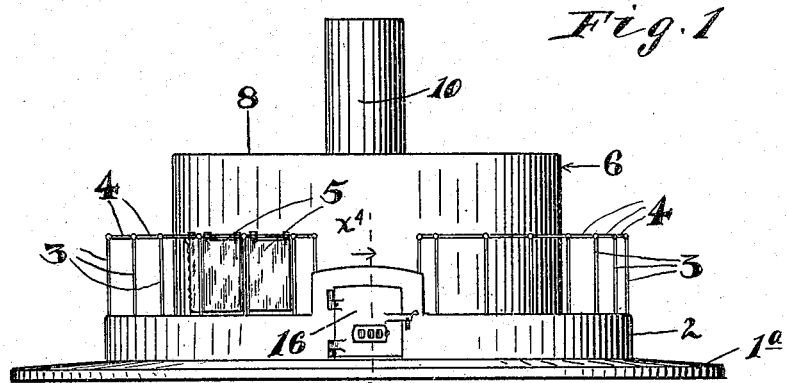
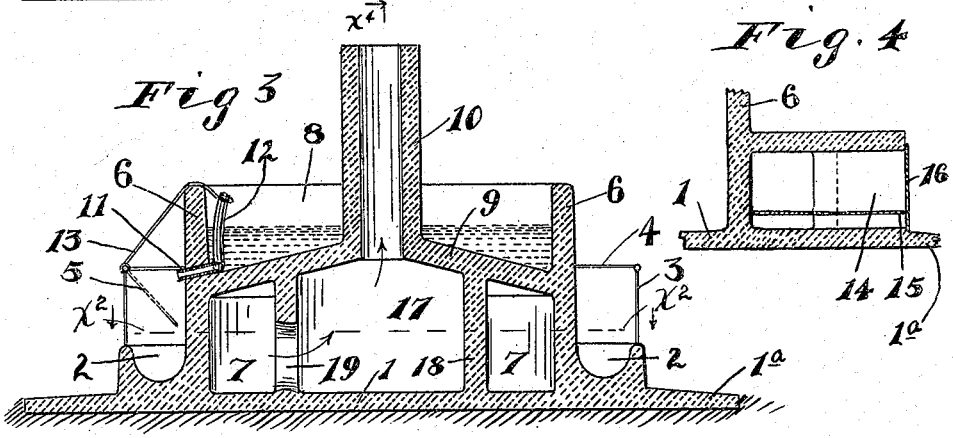
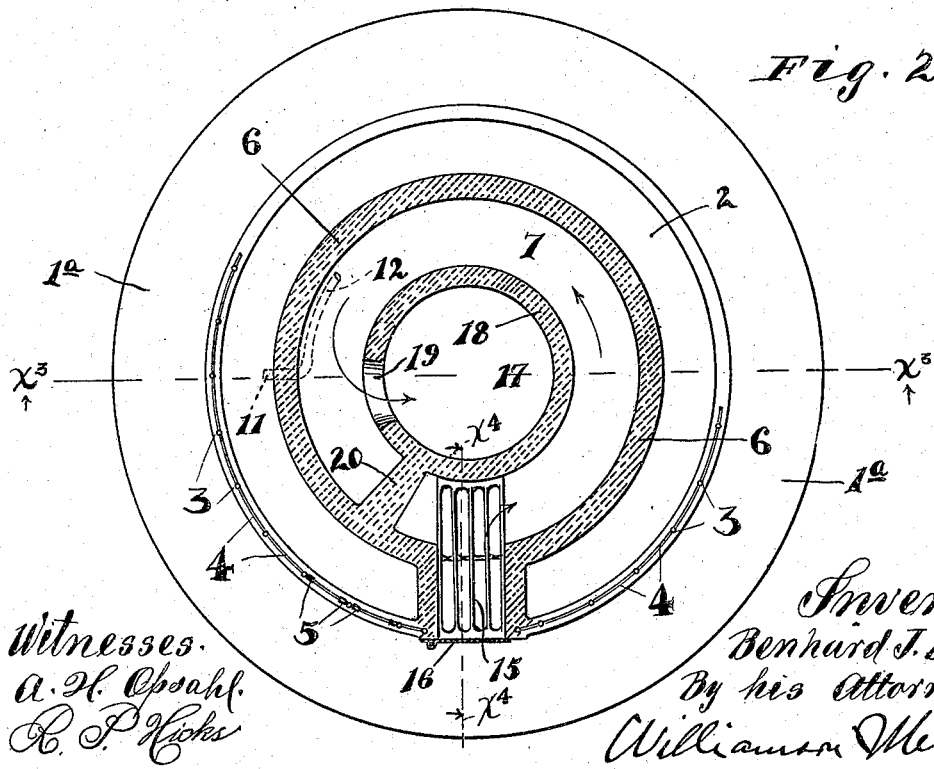
Witnesses
A. H. Opsahl.
R. P. Hicks.
Inventor
Benhard J. Butler
By his Attorneys.
Williamson & Merchant

UNITED STATES PATENT OFFICE.

BENHARD J. BUTLER, OF LAKE MILLS, IOWA.

COMBINED FEED HEATER AND TROUGH.

No. 930,458.

Specification of Letters Patent.

Patented Aug. 10, 1909.

Application filed October 30, 1908. Serial No. 460,295.

*To all whom it may concern:*

Be it known that I, BENHARD J. BUTLER, a citizen of the United States, residing at Lake Mills, in the county of Winnebago and State of Iowa, have invented certain new and useful Improvements in Combined Feed Heaters and Troughs; and I do hereby declare the following to be a full, clear, and exact description of the invention, such as will enable others skilled in the art to which it appertains to make and use the same.

My invention relates to combined feed heaters and troughs, especially adapted for use in feeding hogs, and has for its object to improve the same in the several particulars hereinafter noted.

To the above ends, the invention consists of the novel devices and combinations of devices hereinafter described and defined in the claim.

In the accompanying drawings, which illustrate the invention, like characters indicate like parts throughout the several views.

Referring to the drawings; Figure 1 is a view in side elevation, looking at the front of the improved device, but with some parts removed and others broken away. Fig. 2 is a view principally in horizontal section, taken on the line $x^2 x^2$ of Fig. 3, but with some parts shown in full and other parts broken away. Fig. 3 is a view in vertical section, taken on the line $x^3 x^3$ of Fig. 2; and Fig. 4 is a detail view in vertical section, taken through the central portion of the fuel chamber, on the line $x^4 x^4$ of Fig. 1.

The improved device is constructed of concrete.

The numeral 1 indicates a cylindrical base adapted to rest upon the ground. A feed trough 2, having a concave bottom, is formed slightly above the base 1 and concentric with the outer edge thereof. Said feed trough is also set in from the outer edge of the base 1 a sufficient distance to leave a platform 1ª upon which the pigs may stand with their front feet, while feeding.

To prevent the hogs from crowding one another, and running their snouts along the feed trough 2 while feeding, a series of laterally spaced posts 3 are set around the outer edge of the feed trough 2, with their lower ends embedded in the cement. A railing 4, bent to conform to the curvature of the feed trough 2, is secured to the upper ends of the posts 3.

To keep the hogs from putting their front feet in the feed trough 2, or getting entirely into the trough, a series of doors 5, hinged at their upper ends to the railing 4, normally close the openings between the posts 3. While the hogs are feeding, their heads will hold the doors in the position indicated by dotted lines in Fig. 3. As soon as the hogs move away from the feed trough, the doors 5 will return to their normal position, under the action of gravity.

The inner wall of the feed trough 2 extends considerably above the outer edge of the said trough, and is indicated by the numeral 6. The said wall 6 forms the outer wall of a primary combustion chamber 7 and a supply tank 8. The said supply tank 8 is located above said combustion chamber 7 and is adapted to hold cooked liquid feed. An approximately horizontal partition 9 extends across the intermediate portion of the wall 6, thereby forming the top of the combustion chamber 7 and the bottom of the supply tank 8. The partition 9 is preferably made higher at its center and slopes downward toward its outer edge, in order that the feed within the supply tank 8 will run to the outer edge thereof. A smoke stack 10 is supported at the center of the partition 9, with its smoke passage extending through said partition.

For the purpose of withdrawing the feed from the supply tank 8, a pipe 11 is set in the wall 6 just above the bottom of said supply tank, with its ends projecting slightly beyond either side of the wall 6. To the inner projecting end of the pipe 11 is secured a piece of hose 12, to the free end of which is secured a rope or cord 13. As is evident, when it is desirable to withdraw a portion of the feed from the supply tank 8 and deliver the same to the feed trough 2, the free end of the hose 12 is lowered into the feed by means of the cord 13; and then by raising the free end of the hose above the feed by means of the cord 13, the flow of feed is stopped.

To keep the feed warm in the supply tank 8, a fuel chamber 14 is formed upon the base 1 and projects outward from the wall 6, and is provided with a suitable grate 15 which extends into the primary combustion chamber. The fuel chamber 14 is also provided with a damper-equipped door 16. Within the primary combustion chamber 7 is another or secondary combustion chamber 17 formed by a vertical wall 18 extending from the base 1 to the partition 9. An opening 19 is formed in the wall 18 to afford communication between the primary and secondary combustion chambers.

To cause the smoke and products of combustion to pass through the opening 19 and into the secondary combustion chamber, a wall 20 extends transversely across the primary combustion chamber between the opening 19 and the fuel chamber 14.

The operation of the improved device may be briefly stated as follows:—First, a fire is built in the fuel chamber, and the products of combustion and the smoke will pass around the annular primary combustion chamber through the opening 19 into the secondary combustion chamber, and thence out through the smoke stack, thereby thoroughly heating the walls of the feed trough and the walls and the bottom of the supply tank. After the device is thoroughly heated, the feed is placed in the supply tank; and, as is evident, will be kept warm long after the fire has been allowed to go out.

The large body of concrete contained in the structure will hold a great deal of heat, and will not, as is evident, cool quickly, as would be the case with a construction of metal. The entire body of the device, it will be noted, is in the form of a monolithic concrete structure.

What I claim is:—

A heater of the kind described, constructed of concrete and having a combustion chamber, a supply tank and a feed trough surrounding said combustion chamber formed as monolithic, in combination with a skeleton metal rack extending above said trough, and rigidly secured to the said monolithic structure.

In testimony whereof I affix my signature in presence of two witnesses.

BENHARD J. BUTLER.

Witnesses:
PEDER. P. MEDLANG,
JOHN OPDAHL.